United States Patent
Motz

(10) Patent No.: US 6,532,436 B2
(45) Date of Patent: Mar. 11, 2003

(54) SENSOR

(75) Inventor: Mario Motz, Wernberg (AT)

(73) Assignee: Micronas GmbH, Freiburg (DE)

( * ) Notice: Subject to any disclaimer, the term of this patent is extended or adjusted under 35 U.S.C. 154(b) by 101 days.

(21) Appl. No.: 09/751,656

(22) Filed: Dec. 29, 2000

(65) Prior Publication Data

US 2001/0012988 A1 Aug. 9, 2001

(30) Foreign Application Priority Data

Dec. 30, 1999 (DE) .......................................... 199 64 002

(51) Int. Cl.[7] .............................................. G01R 27/00
(52) U.S. Cl. ...................................... 702/189; 324/525
(58) Field of Search .............................. 702/57, 64, 72, 702/73, 75, 78, 79, 33, 45–48, 97, 99, 100, 103, 104–7, 130–136, 138–142, 146, 183, 189, 193, 198, 199; 324/520, 521, 180, 76.25, 76.41, 76.52, 76.77, 76.82, 105; 73/1.01, 1.34, 1.37, 1.57, 649, 488, 863

(56) References Cited

U.S. PATENT DOCUMENTS

| 4,951,236 A | 8/1990 | Kawate et al. | ......... 364/571.01 |
| 4,982,351 A | 1/1991 | Kawate et al. | ......... 364/571.01 |
| 5,051,937 A | 9/1991 | Kawate et al. | ......... 364/571.01 |

FOREIGN PATENT DOCUMENTS

| DE | 44 09 708 A1 | 9/1995 |
| DE | 197 01 310 A1 | 8/1997 |
| WO | WO 88/01417 | 2/1988 |

Primary Examiner—Marc S. Hoff
Assistant Examiner—Edward Raymond
(74) Attorney, Agent, or Firm—Samuels, Gauthier & Stevens, LLP

(57) ABSTRACT

A sensor includes a transducer that provides a sensed signal to a signal processing device. The signal processing device switches the operating mode as a function of frequency, such that the switching device is operated in the switched operating mode at low frequencies and in the continuous operating mode at high frequencies. In a preferred embodiment, the transducer is a Hall effect sensing device.

14 Claims, 3 Drawing Sheets

SENSOR

BACKGROUND OF THE INVENTION

The present invention relates to sensors, and in particular to sensors such as Hall effect devices that include active offset compensation.

Sensors that include calibration abilities are well known. For example see published German patent application DE 37 86 487 T2, U.S. Pat. Nos. 4,951,236, 4,982,351, and 5,051, 937. These sensors are often characterized by their precision, wide application, and relatively low manufacturing cost. To provide the requisite precision, either the transducer device or the associated signal processing must include signal conditioning/compensation logic to calibrate the device and correct for external effects (e.g., temperature). For example, this may be achieved by calibrating and signal-conditioning the transducer device directly, which often requires considerable expense. Alternatively, the appropriately designed signal processing device within the sensor may be signal-conditioned, calibrated, and adapted to the particular application of the sensor.

Signal processing devices are designed as electronic circuits and consequently can be economically manufactured and relatively easily adapted to the particular application. Furthermore, special measures can compensate for the undesirable influences (e.g., temperature) on the signal processing device and suppress/reduce the interferences to the measurement signal (e.g., noise) by the undesirable influences, thus resulting in a higher accuracy sensor device.

However, with such sensors, the signal processing device processes the measurement signal after it has been created by the transducer, and thus may garble the measurement signal, especially with respect to the time structure of the signal. For example, in the case of periodic or quasi-periodic measurement signals and/or in the case of signal evaluation by a threshold comparison, this may lead to inaccuracies with respect to the switch-over point and the phase behavior of the sensor.

Therefore, there is a need for a sensor device that includes error correction circuitry such as offset correction to mitigate the effect of the undesirable influences on the sensor.

SUMMARY OF THE INVENTION

Briefly, according to an aspect of the present invention, a sensor includes a transducer that provides a sensed signal to a signal processing device. The signal processing device switches the operating mode as a function of frequency, such that the switching device is operated in the switched operating mode at low frequencies and in the continuous operating mode at high frequencies.

In a preferred embodiment, the transducer is a Hall effect sensing device.

In one embodiment, the signal processing device includes clocked digital circuit sections configured to be clocked by a constant frequency clock signal for detecting low frequencies, and by a signal corresponding to the output signal to detect high frequencies.

The signal processing device may also include a switching device to switch the phase position of the measurement signal. Especially when switching between 0° and 180°, with subsequent averaging offset errors can be largely eliminated.

A preferred modification is that at least one switching device has a hysteresis, which can be adjusted by a control signal. Preferably a control device connected to the signal processing device generates the control signal from the measurement signal. Alternatively or additionally, the signal processing device has an offset which can be adjusted by a separate control signal or by the same control signal from the control device. In this connection, a ramp detector can be connected to the control device and can receive the control signal from it, so as to generate an additional output signal.

The control device may obtain the control signal by averaging the output signal from the evaluation device. Alternatively, the control device may obtain the control signal by evaluating the median of the sensor output signal, by evaluating the minima and maxima of the output signal, by evaluating the pulse-duty ratio of the output signal, and by selecting appropriate values from a look-up table which is stored in a memory.

The measurement signal may be processed by forming averages or by detecting filtered peak values.

Advantageously, the inventive sensor is characterized by high accuracy of the switch-over point and phase and nevertheless by uncomplicated circuit technology. In addition, the inventive sensor can be calibrated without great complication.

These and other objects, features and advantages of the present invention will become more apparent in light of the following detailed description of preferred embodiments thereof, as illustrated in the accompanying drawings.

DETAILED DESCRIPTION OF THE INVENTION

Figure 1:
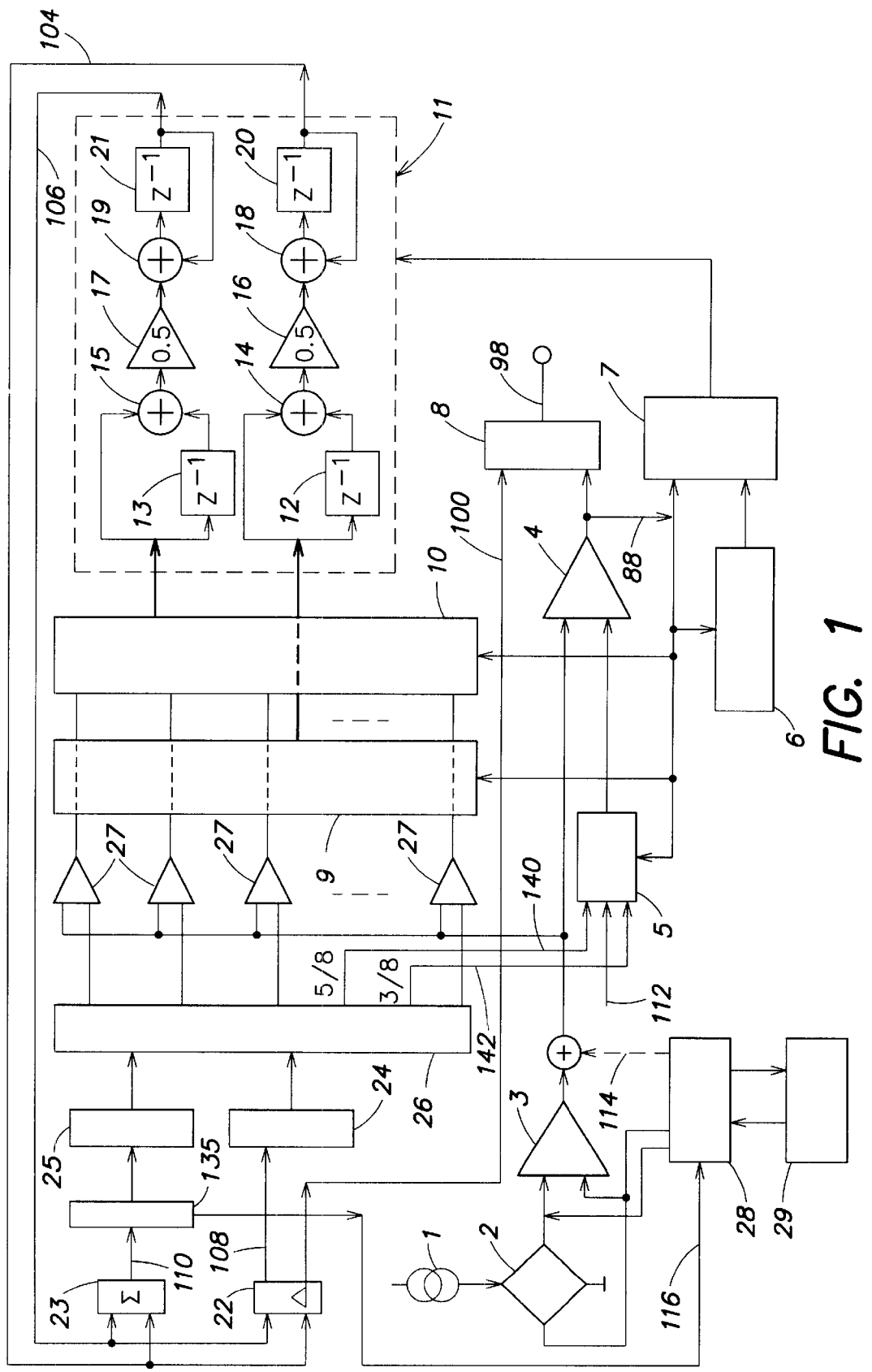
FIG. 1 is a block diagram illustration of a first embodiment of a sensor with a digital circuit section according to the present invention.

FIG. 1 is a block diagram illustration of a first embodiment of a sensor that includes a transducer 2. In this embodiment the transducer 2 is a Hall plate 2 supplied from a current source 1 to detect magnetic fields. The Hall plate 2 is followed by an amplifier 3 (e.g., an operational amplifier or a transconductance amplifier), which amplifies the output signal of the Hall plate 2 and takes care of impedance matching. The output of the amplifier 3 is coupled to the input of a comparator 4, whose other input is connected to the output of a switching matrix 5. The comparator 4 provides a two-state output signal on a line 88 to control the switching matrix 5, an oscillator 6, a clock pulse generator 7, and a switching amplifier 8.

The oscillator 6 is controlled in such a way that it is turned off when the square-wave signal on the line 88 has a high frequency. The clock pulse generator 7 is also driven by the oscillator 6, and it is controlled by the comparator 4 in such a way that it generates a clock pulse with the frequency of the square-wave signal at the output of the comparator 4, when this is a high frequency, but generates a clock pulse with the frequency of the oscillator 6 when the comparator output signal on the line 88 has a low frequency. The switching amplifier 8 transmits the square-wave signal on the line 88 to its own output on a line 98 if this signal has a high frequency, and it switches an additionally available direct switching signal on a line 100 through to its output if the comparator 4 output signal on the line 8 8 has a low frequency. This direct switching signal will be discussed later.

The comparator 4 controls two coders 9, 10 operating on the basis of the thermometer code, and in such a way that one of the two coders 9, 10 (e.g., the coder 9) is reset by the rising edges and the other one of the two coders 9, 10 (e.g., the coder 10) is reset by the falling edges (or vice versa). The outputs of the two coders 9, 10 are input to a digital computing stage 11, which has two identical signal branches, associated respectively with the coders 9, 10. Each of these signal branches is used for digital filtering, and includes a delay element 12, 13 respectively, to which the output signal of the respective coder 9, 10 is applied, as well as an adder 14, 15 respectively, one of whose inputs is in each case connected to the delay element 12 or 13 respectively, and whose other input is driven by the output signal of the respective coder 9, 10. The adders 14, 15 are each followed by coefficient elements 16, 17 respectively (e.g., with a coefficient equal to 0.5). The outputs from the coefficient elements are input to an associated adder 18, 19 respectively, whose other input and output are coupled together through an intermediate delay element 20, 21. The output signals of the computing stage 11 are tapped from the output of the delay elements 20, 21, and provided on lines 104, 106 respectively. The computing stage 11 performs a differentiation (forming a differential) with subsequent weighted summation (integration). In the same manner, however, differentiation with subsequent summation, differentiation alone, or summation alone are also suitable.

The computing stage output signals on lines 104, 106 are input to a difference stage 22 that provides a difference signal on a line 108 indicative of a difference between the two computing stage output signals. The computing stage output signals on the lines 104, 106 are also input to an adding stage 23 that provides a summed signal on a line 110. The difference signal on the line 108 is input to a digital-analog converter 24, while the summed signal is input to a low pass filter 135 that provides a filtered analog output signal. An analog signal (voltage or current) is thus available at the output of the digital-analog converter 24, and this signal corresponds to the amplitude of the signal furnished by the Hall plate 2. The analog signal (voltage or current) output from digital-analog converter 25 corresponds to the superposed offset. Reference signals (current or voltage) generated by a reference stage 26 depend on these two analog signals and the temperature.

Reference signals on the lines 140, 142 are conducted to the switching matrix 5, and the remaining reference signals are applied respectively to an input of several comparators 27. The comparators also receive output of the amplifier 3. The comparators 27 compare the output signal of the amplifier 3, which corresponds to the output signal of the Hall plate 2, to the respective reference signal. The comparator provides a Boolean output signal (i.e., two possible logical signal states) indicative of the comparison. The reference signals are structured in such a way that, as regards the comparators 27, their value constantly increases from comparator to comparator, while the two reference signals on the lines 140, 142 conducted to the switching matrix 5 are arranged about the average (i.e., above and below the average) of the range prescribed by the remaining reference signals (e.g., at ⅜ and ⅝ of the maximum value).

The outputs of the comparators 27, which receive reference signals with a higher value, are here connected to the inputs of the coder 9, and the outputs of the comparators 27 that receive reference signals with lower values are connected to the inputs of the coder 10. Depending on the logical state of the signal at the output of the comparator 4, the switching matrix 5 provides either one reference signal (⅜) or the other reference signal (⅝) to the output as the reference input to the comparator 4. Furthermore, when the voltage supply is turned on, the switching matrix 5 receives an additional control signal on a line 112.

The sensor also includes a digital-analog converter 28 whose output signal on a line 114 is additively/subtractively superposed on the input signal of the amplifier 3. The value of the output signal on the line 114 may be determined on the one hand by a calibration value stored in a memory 29, and, on the other hand, by overflow and underflow signals on a line 116 from the digital low-pass filter 135. The output signal (or another output signal) from the difference stage 22 is input to the switching amplifier 8 to switch the amplifier directly in the case of high frequencies.

The function of the sensor shown in FIG. 1 is based on the amplification of a signal from the Hall plate 2 by the amplifier 3 in such a way that the offset of the amplifier 3 on the one hand may be permanently set through the digital-analog converter 28 and the memory 29 in combination with the digital low-pass filter 135, to achieve a base setting and/or an adaptation to the sensor's environment. On the other hand, the offset is regulated within a certain range about the fixed offset value through the dependence of the offset on the counter state of the digital filter 135. These measures can achieve the result that the offset remains within an optimal range that can be handled by the overall system. The output signal from the Hall plate 2 can be additively/subtractively linked with the output signal on the line 114 from the digital-analog converter 28, additionally or alternatively also at the output of the amplifier 3.

The arbitrarily shaped output signal is converted through a threshold comparison by the comparator 4 into a corresponding square-wave signal. This signal corresponds to the output signal and controls the coders 9, 10, the switching matrix 5, the oscillator 6, the clock pulse generator 7, and the switching amplifier 8. The comparator 4, oscillator 6, clock pulse generator 7, and switching amplifier 8 together ensure that the signal processing device operates in the switched operating mode (chopper mode) at low frequencies, and in the continuous-time mode at high frequencies. The different clock pulse acts primarily on the computing stage 11, which forms the filter of an otherwise non-clocked, digital peak value detector, which again comprises the non-clocked comparators 27 and the non-clocked coders 9, 10. By changing the clock frequency of the computing device, the time behavior of the entire signal processing device is changed.

By evaluating the difference and sum signals separately (differential mode signal, common mode signal), the actual measurement signal of the Hall plate 2 and the offset portion are separated from one another, and thus can be further processed separately. The reference signals used in this connection are preferably structured as a function of temperature in such a way that their behavior compensates the temperature behavior of the remaining signal processing device. The reference signals are then each conducted to their associated parallel comparators 27 and to the switching matrix 5. Thus, in the evaluation of the signal provided by the Hall plate 2, high amplitude and phase fidelity is achieved, and thus a high accuracy of the switch-over point and phase, especially at rather high-frequency alternating signals (e.g., in connection with the magnetic detection of RPMs).

Figure 2:
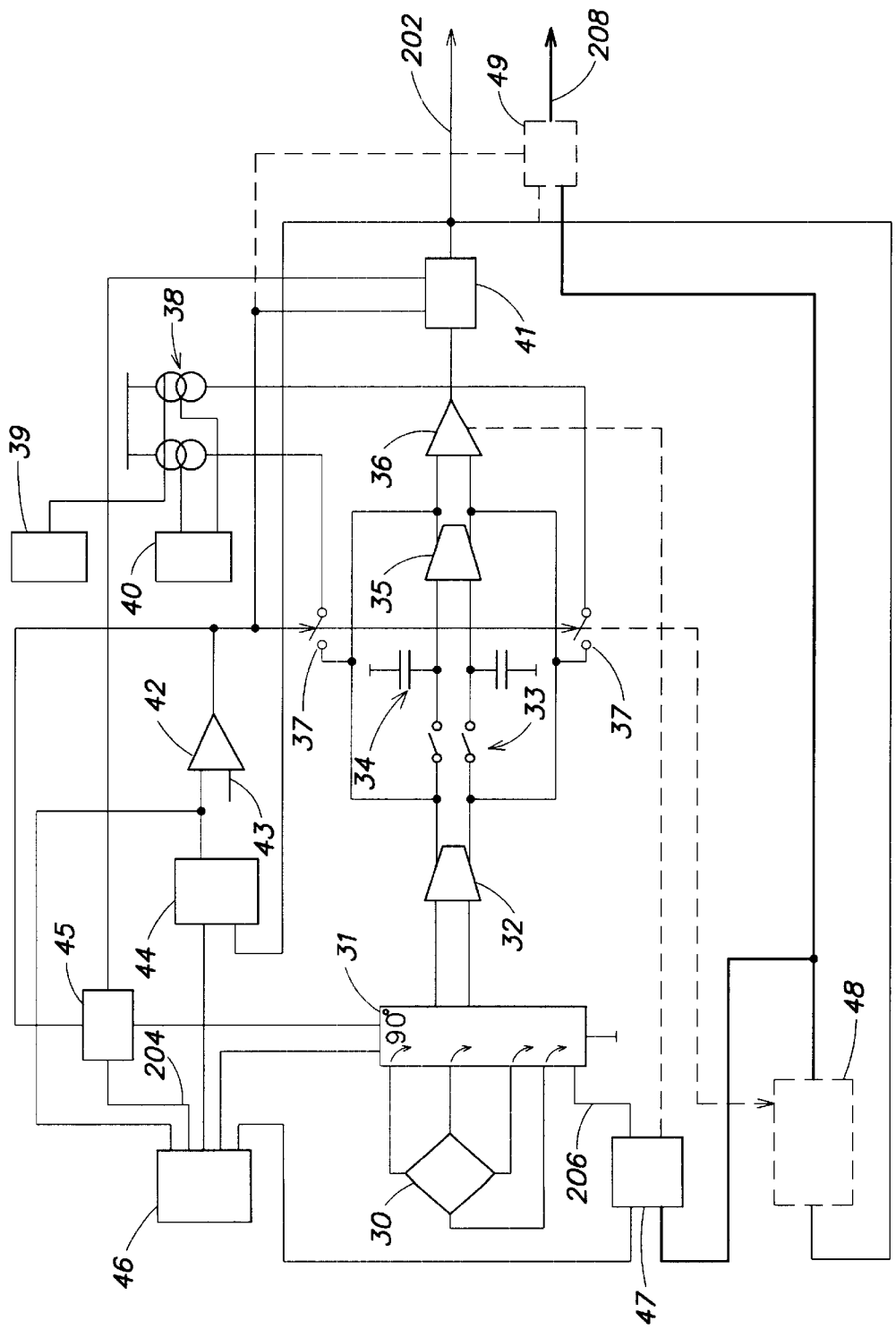
FIG. 2 is a block diagram illustration of a second embodiment that includes a sensor with two switching devices.

The embodiment illustrated in FIG. 2 includes a Hall plate arrangement 30 with a single Hall plate or with several Hall plates connected in parallel. A multiplicity of parallel-connected Hall plates, whose alignment and/or respective current direction is different, can increase accuracy and reduce the resulting offset error. Furthermore, the direction-dependent influences of the crystal lattice are also reduced. In the Hall plate arrangement 30, two terminals are used as input terminals for the Hall supply current, and two terminals as output terminals. The input terminals and output terminals are connected to a switching matrix 31. The switching matrix 31 causes the current direction to switch by 90° within the connected Hall plates. However, for example 180° or 360° shifts may be equally possible. Switching the current direction by 90° is especially suitable, since the resulting offset errors of the Hall plates add to the Hall voltage in one current direction and subtract in the 90° rotated current direction.

The switching matrix 31 has a symmetrical output, followed by a voltage-current converter 32. The symmetric output of the voltage-current converter 32 is again coupled to the symmetric input of a voltage-current converter 35, with a switch pair 33 connected in between. The symmetric input of the voltage current converter 35 is connected to a reference potential by a capacitor pair 34. The symmetric outputs of the voltage-current converters 32, 35 are connected together, and are conducted to the symmetric input of a comparator or a voltage amplifier 36. Furthermore, two reference currents are conducted through a switch pair 37 to the node points formed by the symmetric outputs of the two voltage-current converters 32,35 and by the symmetric input of the voltage amplifier 36. The two reference currents are generated by a pair of current sources 38, and one of these current sources is controlled by a common mode control 39 and the other by a differential mode control 40. The output signal from the voltage amplifier 36 is input to a switched output stage 41 that provides a sensor output signal on a line 202.

The switch pairs 33, 37 are controlled in push-pull mode by the output signal of a comparator 42. A reference signal 43 (e.g., a reference current or a reference potential) is applied to one input of the comparator 42. The other comparator input is received from the output of a frequency-current converter 44. The frequency-current converter 44 output is also input to a clock pulse generator 45. The frequency-current converter 44 is controlled by the sensor output signal on the line 202. The signal at the output of the comparator 42 and the clock pulse signal generated by the clock pulse generator 45 are applied to the switched output stage 41. The clock pulse generator 45 also controls the switching matrix 31, and itself receives the signal at the output of the comparator 42, as well as a temperature-dependent bias signal on a line 204. The bias signal on the line 204 (e.g., current or voltage) is generated by a biasing unit 46, which also generates temperature-dependent bias signals for the switching matrix 31, the frequency-current converter 44, and/or the comparator 42, as well as for an offset and hysteresis signal generator 47. The offset and hysteresis signal generator 47 generates and provides an offset and hysteresis signal on a line 206, which can be modified by a control signal. The offset and hysteresis control signal on the line 206 is input to the switching matrix 31 and possibly the comparator or the voltage amplifier 36. The control signal for the offset and hysteresis signal generator 47 is obtained by a control unit 48 from the sensor output signal on the line 202, which can be tapped from the output of the switched output stage 41. The control unit 48 includes an erasable permanent memory (EEPROM), in which certain calibration values were stored during a calibration, wherein the calibration values are associated with the sensor output signal values. In some circumstances, the output signal of the comparator 42 can also be conducted to the control unit 41. An alternative sensor output signal may be generated by conducting the sensor output signal on the 202 to the ramp detector 49, which generates and provides the alternative sensor output signal on a line 208. The ramp detector 49 may be controlled by the output signal of the comparator 42.

The function of the embodiment of FIG. 2 is based on the fact that the signals generated by the Hall plates 30 are largely freed of the superposed offset by the subsequent switching matrix 31 and by the formation of time averages. The arrangement for forming averages contains the voltage-current converters 32,35, the switchpairs 33,37, the capacitor pair 34, the voltage amplifier 36, and the current source pair 38. The offset appearing in the arrangement for forming averages is eliminated by appropriately controlling the current source pair 38 by common mode control 39 and the differential mode control 40. The clock pulse generator 45, the frequency-current converter 44, and the comparator 42 monitor the frequency of the sensor output signal on the line 202, and switch from a clock pulse with a fixed frequency (generated by the clock pulse generator 45) to a permanent switching through of the output stage 41. The switching is performed such that at low frequencies the clock pulse signal controls the output stage 41, and at high frequencies the output signal of the comparator 42 controls the output stage 41. If the current at the output of the frequency-current converter 44 exceeds the reference signal 43, the comparator 42 flips over and isolates the clock pulse generator 45 from the output stage 41, which is then permanently switched through by the output signal of the comparator 42.

The bias signals preferably are structured as a function of temperature in such a way that their behavior compensates the temperature behavior of the remaining parts of the signal processing device. For example, to achieve a base setting and/or an adaptation to the environment of the sensor, and on the other hand to achieve offset regulation within certain limits an offset regulator that includes the offset and hysteresis signal generator 47 and the control unit 48 is also present. Rather than using a memory, a signal processing unit may be used for example, to form averages, detect the null point, evaluate minimum-maximum, or evaluate the pulse-duty factor, and from this to generate the control signal for the offset and hysteresis signal generator 47. These measures can achieve the result that the offset remains within an optimum range suitable for the overall system. Altogether, therefore, the evaluation of the signal delivered by the Hall plates 30 achieves high amplitude and phase fidelity, and thus again high accuracy of the switching point and phase over a broad frequency range.

Figure 3:
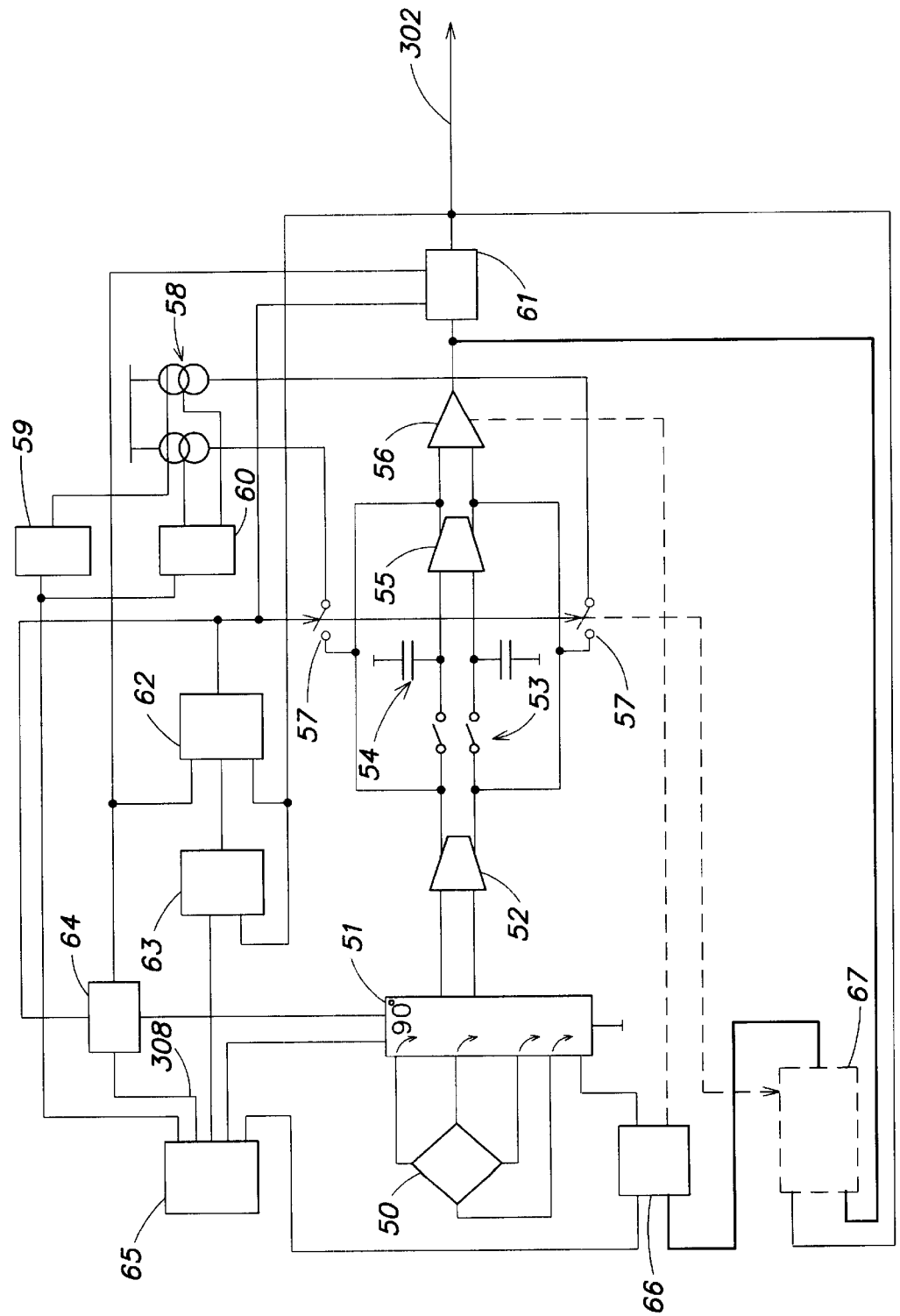
FIG. 3 is a block diagram illustration of a third embodiment of a sensor with two switching devices.

The embodiment attached in FIG. 3 includes a Hall plate arrangement 50 with several (e.g., two) Hall plates connected in parallel to increase accuracy and to reduce the resulting offset error. A switching matrix 51 causes the current direction inside the connected Hall plates to switch in 90° steps.

The switching matrix 51 has a symmetrical output, which is followed by a voltage-current converter 52. The symmetric output of the voltage-current converter 52 is coupled to the symmetric input of a voltage-current converter 55, with a switch pair 53 connected in between. The symmetric input of the voltage-current converter 55 is clamped to a reference potential by a capacitor pair 54. The symmetric outputs of the voltage-current converters 52, 55 are wired together and conducted to the symmetric input of a voltage amplifier 56. Furthermore, two reference currents are conducted through a switch pair 57 to the node points formed by the symmetric outputs of the two voltage-current converters 52, 55 as well as to the symmetric input of the comparator or the voltage amplifier 56. The two reference currents are generated by a current source pair 58, one of the current sources being controlled by a common mode control 59 and the other by a differential mode control 60. The voltage amplifier 56 is followed by a switched output stage 61 that provides a sensor output signal on a line 302.

The switch pair 53, 57 are controlled in push-pull mode by the output signal of a time-frequency comparator 62, whose first input is driven by a clock pulse signal, and whose second input is the sensor output signal on the line 302, and whose third input is coupled to the output of an analog delay device 63. The analog delay device 63 is controlled by the sensor output signal on the line 302 of the sensor. The signal at the output of the comparator 62 and also the clock pulse signal generated by a clock pulse generator 64 are applied to the switched output stage 61. This clock pulse signal is also applied to the time-frequency comparator 62. The clock pulse generator 64 controls the switching matrix 51 and is itself controlled by the signal at the output of the time-frequency comparator 62 and by a temperature-dependent bias signal on a line 308. The bias signal on the line 308 (e.g., current or voltage) for the clock pulse generator 64 is generated by a bias unit 65, which also generates temperature-dependent bias signals for the switching matrix 51, the analog delay 63 frequency current converter 64 and/or the comparator 62, the common mode control 59, the differential mode control 60, and an offset and hysteresis signal generator 66. The offset and hysteresis signal generator 66 generates an offset and hysteresis signal for the switching matrix 51, and in some embodiments for the voltage amplifier 56. This offset and hysteresis signal can be modified by a control signal. The control signal for the offset and hysteresis signal generator 66 is provided by a control unit 67 based upon the sensor output signal on the line 302.

The control unit 67 contains an erasable permanent memory (EEPROM), in which certain values were stored during calibration. These values are associated with certain values of the sensor output signal on the line 302, and are output to the switching matrix 51 as a control signal corresponding to the output signal (and to the calibration). In some circumstances, the output signal of the time-frequency comparator 62 can also be conducted to the control unit 67.

The function of the embodiment of FIG. 3 is based on the fact that the signals generated by the Hall plates 50 are largely freed from the superposed offset by the subsequent switching matrix 51 and by the formation of averages. The arrangement for forming averages contains the voltage-current converters 52, 55, the switch pairs 53, 57, the capacitor pair 54, the voltage amplifier 56, and the current source pair 58. An offset appearing in the arrangement for forming averages is eliminated by appropriately controlling the current source pair 58 by the common mode control 59 and the differential mode control 60. The clock pulse generator 64, the analog delay device 63, and the time-frequency comparator 62 monitor the frequency of the sensor output signal on the line 302 and switch from a clock cycle with a fixed frequency (generated by the clock pulse generator 64) to a permanent switching through of the output stage 61, in such a way that, when the output signal has a low frequency, the clock pulse signal controls the output stage 61 and, when the sensor output signal on the line 302 has a high frequency, the output signal from the comparator 62 controls the output stage 61. If the frequency of the sensor output signal on the line 302 exceeds that of the clock pulse signal from the clock pulse generator 64, the time-frequency comparator 62 flips over, isolating the clock pulse generator 64 from the output stage 61, which then permanently switches through the output signal of the voltage amplifier 56, and at the same time becomes "transparent".

The bias signals are preferably structured as a function of temperature in such a way that their behavior compensates the temperature behavior of the remaining parts of the signal processing device. For example, to achieve a base setting and/or an adaptation to the environment of the sensor, or, on the other hand, to achieve an offset regulation within certain limits, an offset regulator includes the offset and hysteresis signal generator 66 and of the control unit 67 will additionally be present. Instead of using a memory, a signal processing unit can again also be present, which, for example, forms averages, detects null points, evaluates minima and maxima, or evaluates a pulse duty ratio, and from this generates the control signal for the offset and hysteresis signal generator 66. These measures achieve the result that the offset remains within an optimum range, suitable for the overall system. Altogether, in the evaluation of the signal delivered by the Hall plates 50, a high amplitude and phase fidelity is achieved, and thus again a high accuracy of the switching point and phase within a second frequency range.

Although the embodiments use only Hall plates as transducer devices, any other type of transducer device can be used in similar fashion with an inventive sensor.

Although the present invention has been shown and described with respect to several preferred embodiments thereof, various changes, omissions and additions to the form and detail thereof, may be made therein, without departing from the spirit and scope of the invention.

What is claimed is:

1. A sensor, comprising:
    a transducer device to convert a sensed physical quantity into a corresponding electrical measurement signal;
    a signal processing device that receives said electrical measurement signal and generates a offset compensated sensor output signal based upon said measurement signal, said signal processing device including
    (i) at least one switching device for offset compensation; and
    (ii) means for switching the operating mode of said switching device as a function of frequency, such that said switching device is operated in a switched operating mode at low frequencies and in a continuous operating mode at high frequencies.

2. The sensor of claim 1, wherein said signal processing device comprises clocked circuit sections that are clocked by a constant frequency clock pulse signal at low frequencies, and by a signal corresponding to said sensor output signal at high frequencies.

3. The sensor of claim 1, wherein said signal processing device has at least one switching device to switch over the phase of said measurement signal that is coupled to said signal processing device.

4. The sensor of claim 2, wherein at least one switching device includes an adjustable hysteresis, and the amount of said hysteresis is controlled by a control signal value provided by a control device that generates said control signal from said measurement signal.

5. The sensor of claim 1, wherein said signal processing device comprises an offset that is adjusted by a control signal.

6. The sensor of claim 4, wherein the hysteresis and offset can be adjusted by a common control signal.

7. The sensor of claim 4, wherein said signal processing device includes a ramp detector that receives said sensor output signal and said control signal, and generates a ramp detector output signal indicative of said sensor output signal.

8. The sensor of claims 7, wherein said control unit computes said control signal by averaging said sensor output signal.

9. The sensor of claim 7, wherein said control unit computes said control signal by evaluating the median of said sensor output signal.

10. The sensor of claim 7, wherein said control unit computes said control signal by evaluating the minima and maxima of said sensor output signal.

11. The sensor of claim 7, wherein said control unit computes said control signal by evaluating the pulse-duty ratio of said sensor output signal.

12. The sensor of claims 7, wherein signal processing device includes means for generating said control signal using a look-up table of values determined by calibration and stored in said control unit.

13. The sensor of claim 7, wherein said signal processing device comprises means for forming averages, which are actuated by said measurement signal.

14. The sensor of claim 13, wherein said signal processing device comprises means for detecting peak values in response to said measurement signal.

* * * * *